US012683161B2

(12) United States Patent
Chen et al.

(10) Patent No.: US 12,683,161 B2
(45) Date of Patent: Jul. 14, 2026

(54) LITHIUM-ION BATTERY

(71) Applicant: BYD COMPANY LIMITED, Shenzhen (CN)

(72) Inventors: Na Chen, Shenzhen (CN); Rong Hao, Shenzhen (CN); Yi Pan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 564 days.

(21) Appl. No.: 18/315,441

(22) Filed: May 10, 2023

(65) Prior Publication Data

US 2023/0282827 A1 Sep. 7, 2023

Related U.S. Application Data

(63) Continuation of application No. PCT/CN2021/129866, filed on Nov. 10, 2021.

(30) Foreign Application Priority Data

Nov. 11, 2020 (CN) .......................... 202011253796.3

(51) Int. Cl.
 *H01M 4/583* (2010.01)
 *H01M 4/02* (2006.01)
 (Continued)

(52) U.S. Cl.
 CPC ........... *H01M 4/583* (2013.01); *H01M 4/525* (2013.01); *H01M 10/0525* (2013.01);
 (Continued)

(58) Field of Classification Search
 None
 See application file for complete search history.

(56) References Cited

U.S. PATENT DOCUMENTS 6,761,744 B1 7/2004 Tsukamoto et al.
2011/0223482 A1 9/2011 Fujii et al.

FOREIGN PATENT DOCUMENTS

CN 101145621 A 3/2008
CN 103828099 A 5/2014
 (Continued)

OTHER PUBLICATIONS

Zhang et al, KR 20170091149 A, English Translation from FIT (Year: 2017).*

(Continued)

*Primary Examiner* — Colin W. Slifka
(74) *Attorney, Agent, or Firm* — Calfee, Halter & Griswold LLP

(57) ABSTRACT

Provided is a lithium-ion battery, including a positive electrode plate, a separator, and a negative electrode plate. The separator is arranged between the positive electrode plate and the negative electrode plate. The positive electrode plate includes a positive electrode current collector and a positive electrode active layer laminated in sequence. A positive electrode active material in the positive electrode active layer includes lithium manganese iron phosphate and a ternary material. The negative electrode plate includes a negative electrode current collector and a negative electrode active layer laminated in sequence. The negative electrode active layer includes a composite layer and a lithium replenishing layer. A negative electrode active material in the composite layer includes a carbon material and $SiO_x$. An areal density of lithium in the lithium replenishing layer is $m_2 = a*M_1*m_1*\delta*(1-\eta)/M_2$.

20 Claims, 1 Drawing Sheet

(51) Int. Cl.

| | |
|---|---|
| *H01M 4/525* | (2010.01) |
| *H01M 10/0525* | (2010.01) |
| *H01M 50/414* | (2021.01) |
| *H01M 50/434* | (2021.01) |
| *H01M 50/451* | (2021.01) |
| *H01M 50/489* | (2021.01) |

(52) U.S. Cl.

CPC ....... *H01M 50/414* (2021.01); *H01M 50/434* (2021.01); *H01M 50/451* (2021.01); *H01M 50/489* (2021.01); *H01M 2004/021* (2013.01); *H01M 2004/027* (2013.01); *H01M 2004/028* (2013.01)

(56) References Cited

FOREIGN PATENT DOCUMENTS

| | | | |
|---|---|---|---|
| CN | 108306015 | A | 7/2018 |
| CN | 108598386 | A | 9/2018 |
| CN | 108682803 | A | 10/2018 |
| CN | 109346665 | A | 2/2019 |
| CN | 109980180 | A | 7/2019 |
| CN | 110400920 | A | 11/2019 |
| CN | 111416086 | A | 7/2020 |
| CN | 111883771 | A | 11/2020 |
| JP | 2011113783 | A | 6/2011 |
| JP | 2014179221 | A | 9/2014 |
| JP | 2014524133 | A | 9/2014 |
| JP | 2016076317 | A | 5/2016 |
| JP | 2018006129 | A | 1/2018 |
| JP | 2020177739 | A | 10/2020 |
| KR | 10-2011-0083680 | A | | 7/2011 |
| KR | 20170091149 | A * | 8/2017 ........ H01M 10/0525 |
| KR | 10-2019-0033915 | A | | 4/2019 |

OTHER PUBLICATIONS

English translation of International Search Report from PCT/CN2021/129866 dated Jan. 25, 2022.

* cited by examiner

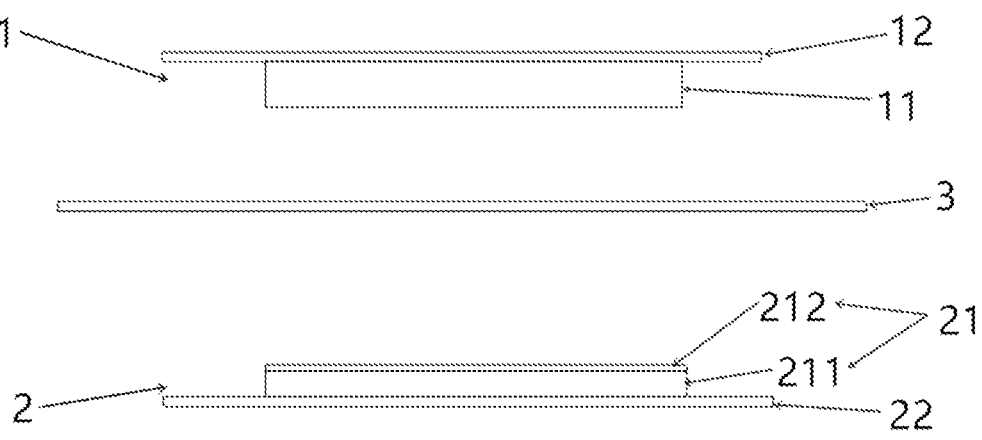

LITHIUM-ION BATTERY

CROSS-REFERENCE TO RELATED APPLICATIONS

This application is a bypass continuation of PCT International Application No. PCT/CN2021/129866, filed on Nov. 10, 2021, which claims priority to and benefits of Chinese Patent Application No. 202011253796.3 filed on Nov. 11, 2020 and entitled "Lithium-ion battery", which are incorporated herein by reference in their entireties.

FIELD

The present disclosure relates to the technical field of power devices, and specifically, the present disclosure relates to a lithium-ion battery.

BACKGROUND

With the gradual strengthening of awareness of energy and environmental protection, new energy vehicles have made great progress in recent years. Electric vehicles are one of the main directions. In the power batteries of electric vehicles, lithium-ion batteries occupy a very important position. Lithium iron phosphate and NCM (nickel-cobalt-manganese) ternary materials are the main choices of positive electrode active materials for lithium-ion batteries.

However, lithium iron phosphate-ternary lithium-ion power batteries in the related art have certain defects. For example, the voltage plateau of lithium iron phosphate is about 3.18 V, the voltage plateau of the NCM ternary material is about 3.65 V, and the charge and discharge voltage plateaus do not match when lithium iron phosphate and the NCM ternary material are used in combination, resulting in low specific capacity and safety performance of lithium-ion batteries.

SUMMARY

Embodiments of the present disclosure provides a lithium-ion battery to solve the problem that conventional lithium-ion batteries cannot achieve a high specific capacity and high safety at the same time.

To solve the above problems, the embodiments of the present disclosure adopt the following technical solutions. An embodiment of the present disclosure provides a lithium-ion battery, including:

a positive electrode plate, a separator, and a negative electrode plate, wherein the separator is arranged between the positive electrode plate and the negative electrode plate;

the positive electrode plate includes a positive electrode current collector and a positive electrode active layer laminated in sequence; a positive electrode active material in the positive electrode active layer includes lithium manganese iron phosphate and a ternary material; based on the total mass of the positive electrode active material, a percentage by mass of the lithium manganese iron phosphate ranges from 70% to 90%, and a percentage by mass of the ternary material ranges from 10% to 30%;

the negative electrode plate includes a negative electrode current collector and a negative electrode active layer laminated in sequence; the negative electrode active layer includes a composite layer and a lithium replenishing layer; a negative electrode active material in the composite layer includes a carbon material and $SiO_x$; based on the total mass of the negative electrode active material, a percentage by mass of the carbon material ranges from 70% to 90%, and a percentage by mass of $SiO_x$ ranges from 10% to 30%; and an areal density of lithium in the lithium replenishing layer is $m_2 = a*M_1*m_1*\delta*(1-\eta)/M_2$, wherein $m_2$ is measured in $g/dm^2$; $M_1$ is a value of a specific discharge capacity of $SiO_x$, and the specific discharge capacity is measured in $mAh/g$; $m_1$ is a double-side areal density of the negative electrode plate, and $m_1$ is measured in $g/dm^2$; $\delta$ is a percentage by mass of the $SiO_x$ material in the negative electrode active material; $\eta$ is first efficiency of a $SiO_x$ button half cell, wherein the first efficiency is a ratio of a first discharge capacity to a first charge capacity; $M_2$ is a value of a specific capacity of lithium, and the specific capacity is measured in $mAh/g$; and a value of a ranges from 1.05 to 1.15, and a value of x ranges from 0.6 to 1.5.

In some embodiments of the present disclosure, based on the total mass of the positive electrode active material, the percentage by mass of the lithium manganese iron phosphate ranges from 78% to 83%, and the percentage by mass of the ternary material ranges from 17% to 22%; and based on the total mass of the negative electrode active material, the percentage by mass of the carbon material ranges from 83% to 88%, and the percentage by mass of the $SiO_x$ ranges from 12% to 17%.

In some embodiments of the present disclosure, a double-side areal density of the positive electrode plate ranges from 4.5 $g/dm^2$ to 5.0 $g/dm^2$, and a compaction density of the positive electrode plate ranges from 2.7 $g/cm^3$ to 2.8 $g/cm^3$; and the double-side areal density of the negative electrode plate ranges from 1.56 $g/dm^2$ to 1.92 $g/dm^2$, and a compaction density of the negative electrode plate ranges from 1.60 $g/cm^3$ to 1.65 $g/cm^3$.

In some embodiments of the present disclosure, a general formula of the ternary material is $LiNi_{a1}Co_{b1}X_{c1}O_2$, wherein $0 \le a1 \le 1$, $0 \le b1 \le 1$, $0 \le c1 \le 1$, $a1+b1+c1=1$, and X is at least one metal element in Group IIIB to group VA.

In some embodiments of the present disclosure, the carbon material includes at least one of hard carbon and carbon-coated graphite secondary particle.

In some embodiments of the present disclosure, a value of x ranges from 0.8 to 1.2.

In some embodiments of the present disclosure, a injection coefficient of an electrolyte solution in the lithium-ion battery ranges from 2.9 to 3.2.

In some embodiments of the present disclosure, the separator is arranged between the positive electrode plate and the negative electrode plate, the separator includes a polymer layer, a ceramic layer and an adhesive layer laminated in sequence, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

In some embodiments of the present disclosure, a thickness of the positive electrode current collector ranges from 7 μm to 13.5 μm, and a thickness of the negative electrode current collector ranges from 3.5 μm to 7 μm.

The technical solutions adopted by the embodiments of the present disclosure can achieve the following beneficial effects.

The embodiments of the present disclosure provide a lithium-ion battery, including: a positive electrode plate, a separator, and a negative electrode plate, wherein the separator is arranged between the positive electrode plate and the negative electrode plate; the positive electrode plate includes a positive electrode current collector and a positive electrode active layer laminated in sequence; a positive electrode active material in the positive electrode active layer includes lithium manganese iron phosphate and a ternary material; the negative electrode plate includes a negative electrode current collector and a negative electrode active layer laminated in sequence; the negative electrode active layer includes a composite layer and a lithium replenishing layer; a negative electrode active material in the composite layer includes a carbon material and $SiO_x$; and an areal density of lithium in the lithium replenishing layer is $m_2=a*M_1*m_1*\delta*(1-\eta)/M_2$. The positive electrode active material of the lithium-ion battery provided in the embodiments of the present disclosure is a composite of the lithium manganese iron phosphate and the ternary material, and the negative electrode active material is a composite of the carbon material and $SiO_x$. On the basis of increasing the charge and discharge capacities of the negative electrode active layer by $SiO_x$, the content of active lithium in the negative electrode active layer is ensured by adding the lithium replenishing layer. The multiple performance requirements of specific capacity, service life and safety of the lithium-ion battery are ensured.

Additional aspects and advantages of the present disclosure will be partly given in and partly apparent from the description below, or understood through practice of the present disclosure.

BRIEF DESCRIPTION OF THE DRAWINGS

The drawings illustrated herein are used to provide a further understanding of the present disclosure and form part of the present disclosure, and the exemplary embodiments and description of the present disclosure are used to explain the present disclosure but do not constitute an improper limitation on the present disclosure. In the drawings, FIG. 1 is a schematic structural diagram of a lithium-ion battery according to an embodiment of the present disclosure.

LIST OF REFERENCE NUMERALS

1—positive electrode plate; 11—positive electrode active layer; 12—positive electrode current collector; 2—negative electrode plate; 21—negative electrode active layer; 211—composite layer; 212—lithium replenishing layer; 22—negative electrode current collector; 3—separator.

DETAILED DESCRIPTION

To make the object, technical solutions and advantages of the present disclosure clearer, the technical solutions of the present disclosure will be clearly and completely described in the following with reference to specific embodiments of the present disclosure and the corresponding drawings. Apparently, the embodiments described are merely some embodiments, rather than all of the embodiments of the present disclosure. All other embodiments obtained by a person of ordinary skill in the art based on the embodiments of the present disclosure without creative efforts shall fall within the protection scope of the present disclosure.

In the specification and claims of the present disclosure, the terms "first", "second" or the like are intended to distinguish between similar objects but do not indicate a particular order or sequence. It is to be understood that the data termed in such a way are interchangeable in appropriate circumstances, so that the embodiments of the present disclosure can be implemented in orders other than the order illustrated or described herein. An object distinguished by the terms such as "first" and "second" generally means a type of object, and is not intended to limit the number of objects. For example, "first object" may mean one or more first objects. In addition, "and/or" in the specification and claims indicates at least one of the associated objects. The character "/" generally indicates an "or" relation between the associated objects.

The technical solution disclosed in the embodiments of the present disclosure will be described in detail below with reference to the accompanying drawings.

Referring to FIG. 1, an embodiment of the present disclosure provides a lithium-ion battery, including:

a positive electrode plate 1, a separator 3, and a negative electrode plate 2. The separator 3 is arranged between the positive electrode plate 1 and the negative electrode plate 2. The positive electrode plate 1 includes a positive electrode current collector 12 and a positive electrode active layer 11 laminated in sequence. A positive electrode active material in the positive electrode active layer 11 includes lithium manganese iron phosphate (LMFP) and a ternary material. The negative electrode plate 2 includes a negative electrode current collector 22 and a negative electrode active layer 21 laminated in sequence. The negative electrode active layer 21 includes a composite layer 211 and a lithium replenishing layer 212. The composite layer 211 is arranged on the negative electrode current collector 22. The lithium replenishing layer 212 is arranged on one side of the composite layer 211 away from the negative electrode current collector 22. The negative electrode active material in the composite layer 211 includes a carbon material and $SiO_x$ (silicon oxide). The silicon oxide includes but is not limited to silicon monoxide, and may also include silicon oxide with a number of oxygen atoms coordinated with one silicon atom being less than 1, and silicon oxide with a number of oxygen atoms coordinated with one silicon atom being greater than 1.

Based on the total mass of the positive electrode active material, the percentage by mass of the LMFP ranges from 70% to 90%, and the percentage by mass of the ternary material ranges from 10% to 30%. Based on the total mass of the negative electrode active material, the percentage by mass of the carbon material ranges from 70% to 90%, and the percentage by mass of $SiO_x$ ranges from 10% to 30%. A lithium replenishing material of the lithium replenishing layer 212 may be a lithium powder or lithium foil. An areal density of lithium in the lithium replenishing layer 212 is $m_2=a*M_1*m_1*\delta*(1-\eta)/M_2$;

wherein $m_2$ is measured in $g/dm^2$; $M_1$ is a value of a specific discharge capacity of $SiO_x$, and the specific discharge capacity is measured in mAh/g; $m_1$ is a double-side areal density of the negative electrode plate, and $m_1$ is measured in $g/dm^2$; $\delta$ is a percentage by mass of the $SiO_x$ material in the negative electrode active material, i.e., the percentage by mass $\delta$ of $SiO_x$ in the negative electrode active material ranges from 10% to 30%; $\eta$ is first efficiency of a $SiO_x$ button half cell, wherein the first efficiency is a ratio of a first discharge capacity to a first charge capacity; $M_2$ is a value of a specific capacity of lithium, and the specific capacity is measured in mAh/g; and a ranges from 1.05 to 1.15, and x ranges from 0.6 to 1.5.

Specifically, when the value of x ranges from 0.6 to 1.5, the $SiO_x$ material has the characteristics of high charge and discharge capacities and small volume expansion. When x in $SiO_x$ is less than 0.6, the performance of $SiO_x$ is close to that of pure silicon, that is, the volume expansion in the charging and discharging process is large, which leads to continuous damage and repair of the SEI film, consumption of active lithium in the positive electrode material, and decrease of the cycle performance. In addition, repeated expansion results in cracking and differentiation of the $SiO_x$ material, the structural stability is reduced, and the performance of the lithium-ion battery is affected. When x in $SiO_x$ is greater than 1.5, the proportion of lithium silicate with no electrochemical activity generated by the reaction between $SiO_x$ and lithium increases, which reduces the exertion of specific capacity of the $SiO_x$ negative electrode and therefore reduces the cycle performance of the lithium-ion battery.

Specifically, an SEI film is formed in the charging and discharging process of the negative electrode active material of the lithium-ion battery. The formation of the SEI film requires the consumption of reversible active lithium in the positive electrode active material. The first efficiency of the LMFP is higher than that of graphite. The loss of irreversible lithium caused by the first efficiency problem of the LMFP material is not enough for the consumption by graphite to form the SEI film. Consequently, the consumption of other active lithium ions of the LMFP is also required in the process of forming the SEI film on the negative electrode active material, resulting in a loss of active lithium ions of the LMFP, leading to a low actual specific capacity of the LMFP in the full cell, and reducing the energy density of the lithium-ion battery. However, the ternary material has the problem of low first efficiency, and a large quantity of irreversible lithium left in the negative electrode may be used for forming the SEI film on the negative electrode active material in the negative electrode plate 2, thereby avoiding the consumption of active lithium ions of the LMFP in the process of forming the SEI film on the negative electrode active material. This is equivalent to supplementing lithium to the LMFP, thereby improving the exertion of the specific capacity of the LMFP. Moreover, the compaction density of the LMFP is low, and the addition of the ternary material with high compaction density can improve the compaction density of the positive electrode plate 1, thereby improving the energy density of the lithium-ion battery. Therefore, the positive electrode active material of the lithium-ion battery in the present disclosure can make full use of the specific capacity and safety performance of LMFP, thereby improving the capacity, service life, and safety of the lithium-ion battery.

The negative electrode active material provided in the embodiments of the present disclosure includes silicon oxide added therein. Because the specific discharge capacity $M_1$ of silicon oxide may reach 1300 mAh/g to 1500 mAh/g, which is three to five times the specific discharge capacity of conventional carbon materials, the first efficiency $\eta$ of silicon oxide may reach 82% to 88%, the addition of silicon oxide can significantly increase the charge and discharge capacity of the negative electrode active material, and reduce the amount of coating materials of the negative electrode active material and the thickness dimension of the negative electrode active layer and the negative electrode plate. However, silicon oxide consumes a large quantity of irreversible lithium ions during the first charging and discharging process. According to the lithium-ion battery provided in the embodiments of the present disclosure, lithium is supplemented to the negative electrode plate 2, that is, the negative electrode active layer 21 includes the composite layer 211 and the lithium replenishing layer 212, to ensure the active lithium capacity of the positive electrode active material in the charging and discharging process, thereby improving the cycle life of the lithium-ion battery.

The positive electrode active material of the lithium-ion battery provided in the embodiments of the present disclosure is a composite material of the LMFP and the ternary material, the negative electrode active layer 21 adopts a negative electrode active material composite design including the composite layer 211 and the lithium replenishing layer 212. On the basis of increasing the charge and discharge capacity of the negative electrode active layer 21 by silicon oxide, the content of reversible active lithium in the battery is ensured by the addition of the lithium replenishing layer 212. The energy density of the lithium-ion battery provided in embodiments of the present disclosure can reach 250 Wh/kg or more, the capacity retention rate after 2000 charging and discharging cycles can reach 76% or more, and DSC trigger temperature of the positive electrode active material is higher than 255° C., that is, the positive electrode active material can operate safely at a temperature not higher than 255° C., thereby improving the specific capacity, service life, and safety of the lithium-ion battery.

According to an embodiment of the present disclosure, based on the total mass of the positive electrode active material, the percentage by mass of the LMFP ranges from 78% to 83%, and the percentage by mass of the ternary material ranges from 17% to 22%. A double-side areal density of the positive electrode plate ranges from 4.5 g/dm² to 5.0 g/dm², and a compaction density of the positive electrode plate 1 ranges from 2.7 g/cm³ to 2.8 g/cm³. Specifically, the double-side areal density is the mass of the electrode material coated on the foil per unit area when two sides of the are coated.

Specifically, in cases where the ternary material and the LMFP material are used in combination in the positive electrode active material of conventional lithium-ion batteries, when the proportion of the ternary material in the positive electrode active material is too low, the loss of lithium ions by the ternary material due to low first efficiency is not enough for graphite to consume and form the SEI film, so additionally lithium ions in LMFP need to be consumed to form the SEI film on graphite in the negative electrode plate, leading to a low actual specific capacity of the LMFP in the positive electrode plate. When the proportion of the ternary material in the positive electrode active material is too high, the poor structural stability of the ternary material compared with the LMFP leads to a low cycling capacity retention rate of the mixed system of the positive electrode active material; and the safety performance of the ternary material in the charging and discharging process is low, which is not conducive to the safe use of the lithium-ion battery. Therefore, when the first efficiency of the mixed positive electrode active material and the first efficiency of the negative electrode active material in the lithium-ion battery provided in the embodiments of the present disclosure reach a balance, that is to say, the total quantity of irreversible active lithium in the ternary material and the LMFP material exactly satisfies the formation of the SEI film in the negative electrode active material, thereby ensuring the exertion of the capacity of the LMFP material in the positive electrode active material. In addition, the thickness of the positive electrode active material can be effectively adjusted through the control of the double-side areal density and the compaction density of the positive electrode plate 1, that is, the double-side areal density of the positive electrode plate 1 divided by the compaction density of the positive electrode plate 1 equals the thickness of the positive electrode active material. By adjusting the thickness size of the positive electrode active material, the total capacity of the positive electrode active material can be effectively controlled, and the energy density of the battery can be improved.

According to an embodiment of the present disclosure, a general formula of the ternary material is $LiNi_{a1}Co_{b1}X_{c1}O_2$, wherein $0 \leq a1 \leq 1$, $0 \leq b1 \leq 1$, $0 \leq c1 \leq 1$, $a1+b1+c1=1$, and X is at least one metal element in Group IIIB to group VA. Further, X may be one or more of Mn, Al, Zr, Ti, Y, Sr, and W, and the percentage by mass of Ni in the ternary material ranges from 80% to 95%.

Specifically, the Mn element in the ternary material may be partially or completely replaced by Al, Zr, Ti, Y, Sr, W or other elements to improve the safety stability and the integrity of the crystal structure of the ternary material. In addition, when the percentage by mass of Ni in the ternary material ranges from 80% to 95%, the ternary material is called a high-nickel ternary material. The high-nickel ternary material has the advantages of low cost, high energy density, high reversible capacity and environmental friendliness, and can greatly improve the specific capacity and cycle life of the lithium-ion battery. Although the safety performance of the high-nickel ternary material is poor, a safety level close to that of the LMFP system can be achieved when the mixing ratio of the LMFP and the high-nickel ternary material is within a certain range, thereby ensuring the safety of users.

According to an embodiment of the present disclosure, based on the total mass of the negative electrode active material, the percentage by mass of the carbon material ranges from 83% to 88%, and the percentage by mass of the $SiO_x$ ranges from 12% to 17%. The double-side areal density of the negative electrode plate 2 ranges from 1.56 $g/dm^2$ to 1.92 $g/dm^2$, that is, the double-side areal density $m_1$ of the negative electrode plate 2 ranges from 1.56 $g/dm^2$ to 1.92 $g/dm^2$, and a compaction density of the negative electrode plate 2 ranges from 1.60 $g/cm^3$ to 1.65 $g/cm^3$. An injection coefficient of an electrolyte solution in the lithium-ion battery ranges from 2.9 to 3.2.

Specifically, the carbon material in the negative electrode active material can ensure the exertion of the reversible capacity of the lithium-ion battery, and silicon oxide can increase the charge and discharge capacity of the negative electrode active material. A too high content of the carbon material in the negative electrode active material is not conducive to improving the capacity of the negative electrode active material. The addition of excessive silicon oxide will result in a large volume expansion, which is not conducive to the structural stability of the negative electrode material and the cycle performance of the battery. Therefore, in the lithium-ion battery provided in the embodiments of the present disclosure, the percentage by mass of the carbon material in the negative electrode active material is controlled within the range of 83% to 88%, that is, the percentage by mass of silicon oxide ranges from 12% to 17%. While ensuring the relative stability of the structure of the lithium-ion battery, the specific capacity of the lithium-ion battery is improved. In addition, the thickness of the negative electrode active material can be effectively adjusted through the control of the double-side areal density and the compaction density of the negative electrode plate 2, that is, the double-side areal density of the negative electrode plate 2 divided by the compaction density of the negative electrode plate 2 equals the thickness of the negative electrode active material. By adjusting the thickness size of the negative electrode active material, the capacity density and the rate performance of the negative electrode active layer 21 can be ensured.

According to an embodiment of the present disclosure, the carbon material includes at least one of hard carbon and carbon-coated graphite secondary particle.

Specifically, because hard carbon has the characteristic of wide interlamellar spacing, the volume change of hard carbon is small during lithium ion deintercalation/intercalation during charge and discharge. When mixed with silicon oxide, hard carbon can alleviate the expansion of the negative electrode plate to a certain extent. Moreover, the charging and discharging plateaus of hard carbon are close to those of silicon oxide, so hard carbon and silicon oxide can work at the same time in the charging and discharging process, thereby further conducive to realizing the rapid charging of the lithium-ion battery. The carbon-coated graphite secondary particle refers to the secondary granulation of a graphite material and the carbon-coated treatment on the graphite surface. The graphite has the advantages of few side reactions, high charging and discharging efficiency, and more importantly, the volume expansion of the graphite is small during charging and discharging.

According to an embodiment of the present disclosure, the value of x in the silicon oxide may further range from 0.8 to 1.2. According to a specific embodiment of the present disclosure, the value of x in the silicon oxide range from 0.9 to 1.1. The silicon oxide has the characteristics of high reversible charge and discharge capacity and small volume expansion compared with conventional silicon-based materials such as pure silicon and $SiO_2$ and so on.

According to an embodiment of the present disclosure, the separator 3 includes a polymer layer, a ceramic layer, and an adhesive layer. The polymer layer may be PP or PE. The PP or PE has high chemical stability, and can ensure the safety performance of the lithium-ion battery. In addition, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

Specifically, the lamination sequence of the separator 3 is the polymer layer, the ceramic layer, and the adhesive layer. That is, taking the polymer layer as the base layer, the ceramic layer and the adhesive layer are arranged on the surface of the polymer layer in sequence. The ceramic layer and the adhesive layer are arranged on one side of the polymer layer close to the positive electrode plate 1. The ceramic layer can improve the oxidation resistance of the separator, and the adhesive layer can enhance the connection strength between the separator 3 and the positive electrode plate 1, thereby avoiding dislocation during the assembly and usage of the battery. In a specific implementation, the thickness of the polymer layer is 7 μm, the thickness of the ceramic layer is 2 μm, and the thickness of the adhesive layer is 2 μm.

According to an embodiment of the present disclosure, referring to FIG. 1, the thickness of the positive electrode current collector 12 ranges from 7 μm to 13.5 μm, and the thickness of the negative electrode current collector 22 ranges from 3.5 μm to 7 μm. Comprehensive control of the thickness of the positive electrode current collector 12 and the thickness of the negative electrode current collector 22 can effectively make full use of the energy density of the lithium-ion battery on the basis of ensuring the safety performance of the lithium-ion battery. In a specific implementation, the positive electrode current collector 12 is an aluminum foil with a thickness of 12 μm, and the negative electrode current collector 22 is a copper foil with a thickness of 6 μm.

According to an embodiment of the present disclosure, in order to ensure the integrity of the structure and the conductive network of the positive electrode plate 1, the positive electrode plate 1 may further include an adhesive and a conductive agent. Based on the positive electrode active material, the content of the adhesive ranges from 0.3 to 2.0 parts by mass and the content of the conductive agent ranges from 0.5 to 2.5 parts by mass. In a specific embodiment of the present disclosure, the content of the conductive agent is 1.0 to 1.8 parts by mass. The conductive agent of the positive electrode plate 1 may adopt a conductive system including point-point, point-line and point-surface combinations. For example, a combination of conductive carbon black, carbon nanotubes, and graphene with different diameters is adopted. Conductive carbon black may be used as a point-like conductive material, carbon nanotubes may be used as a linear conductive material, and graphene may be used as a planar conductive material, so as to achieve a conductive system combining points, lines, and surfaces. In addition, in order to ensure the integrity of the structure and the conductive network of the negative electrode plate 2, the negative electrode plate 2 may further include an adhesive and a conductive agent. Based on the negative electrode active material, the content of the adhesive ranges from 2.5 to 7.5 parts by mass. The adhesive may be SBR and/or CMC. SBR is styrene butadiene rubber and CMC is sodium carboxymethyl cellulose, both SBR and CMC may be used as a binder and thickener in the negative electrode active layer, to improve the peel strength of the negative electrode active layer and keep the negative electrode plate flexible. Based on the negative electrode active material, the content of the conductive agent in the negative electrode plate ranges from 0.2 to 1.5 parts by mass. In a specific embodiment of the present disclosure, the content of the conductive agent is 0.5 to 1.2 parts by mass. The conductive agent of the negative electrode plate 2 may also adopt a conductive system including point-line and line-line combinations.

The technical solutions of the present disclosure will be described in detail below through specific examples.

Selection of Positive Electrode Active Material:

LMFP with a first charge capacity of 165 mAh/g and a first efficiency of 98% was selected, and a high-nickel ternary material (molar ratio, Ni:Co:Mn=0.83:0.12:0.05) with a first charge capacity of 238 mAh/g and a first efficiency of 86% was selected. The LMFP and the high-nickel ternary material were mixed to form the positive electrode active material.

Selection of Negative Electrode Active Material:

Silicon oxide and carbon-coated graphite secondary particle with a first discharge capacity of 355 mAh/g and a first efficiency of 95% were selected. The carbon-coated graphite secondary particle and silicon oxide were mixed to form the negative electrode active material.

Selection of Lithium Replenishing Layer:

The lithium replenishing layer was prepared by lithium powder.

Selection of Separator:

The separator was a composite separator including PP, ceramic and adhesive layers. The thickness of the PP layer was 7 μm, the thickness of the ceramic layer was 2 μm and the thickness of the adhesive layer was 2 μm.

10

Selection of Electrolyte Solution:

An electrolyte solution using lithium hexafluorophosphate as the main electrolyte was used as the electrolyte solution in lithium-ion battery.

Lithium-ion batteries of the following examples were prepared according to the above selected positive electrode active material, negative electrode active material, lithium replenishing layer, separator and electrolyte solution. The preparation process was as follows.

In S101, NMP (N-methylpyrrolidone) and PVDF (polyvinylidene fluoride) were added into a mixer and stirred for 1 h. Then conductive carbon black was added as a conductive agent and stirred for 0.5 h. The positive electrode active material was added and stirred for 1.5 h to form a positive electrode slurry. The positive electrode slurry was sieved and coated on a 12 μm thick aluminum foil current collector. The aluminum foil coated with the positive electrode slurry was vacuum dried at 80° C. for 12 h. Finally the dried aluminum foil coated with the positive electrode slurry was rolled and cut to obtain the positive electrode plate.

In S102, water, SBR and CMC were added into a mixer and stirred for 1 h. Then conductive carbon black was added as a conductive agent and stirred for 0.5 h. The negative electrode active material was added and stirred for 1.5 h to form a negative electrode slurry. The negative electrode slurry was sieved and coated on a 6 μm thick copper foil current collector. The copper foil coated with the negative electrode slurry was vacuum dried at 100° C. for 12 h. Finally the dried copper foil coated with the negative electrode slurry was rolled and cut to obtain the negative electrode plate.

In S103, lithium powder was deposited on the surface of the negative electrode active material of the negative electrode plate to form a lithium-replenished negative electrode plate.

In S104, the positive electrode plate, the separator, and the lithium-replenished negative electrode plate were placed into a battery case and the separator was located between the positive electrode plate and the lithium-replenished negative electrode plate, then the electrolyte solution is filled, and the battery case is sealed to obtain a lithium-ion battery.

Specifically, lithium-ion batteries of Examples 1 to 24 and Comparative Examples 1 to 7 below were obtained.

Example 1

The percentage by mass of the LMFP in the positive electrode active material was 80%. The percentage by mass of the high-nickel ternary material in the positive electrode active material was 20%. In the negative electrode active material of the negative electrode active layer, and the percentage by mass of graphite was 86%, the percentage by mass δ of silicon oxide was 14%. The areal density of lithium in the lithium replenishing layer was $m_2=a*M_1*m_1*\delta*(1-\eta)/M_2$, wherein, a is 1.1, x is 1.1, the specific discharge capacity $M_1$ of silicon oxide is 1435 mAh/g, the first efficiency η of silicon oxide is 85%, the specific capacity $M_2$ of lithium is 2400 mAh/g, the double-side areal density of the positive electrode plate is 4.5 g/dm², the compaction density of the positive electrode plate is 2.7 g/cm³, the double-side areal density $m_1$ of the negative electrode plate is 1.56 g/dm², the compaction density of the negative electrode plate is 1.60 g/cm³, the injection coefficient of the electrolyte solution is 2.9, and the areal density of lithium in the lithium replenishing layer is 0.0215 g/dm².

Example 2

The percentage by mass of the LMFP in the positive electrode active material was 78%. The percentage by mass of the high-nickel ternary material in the positive electrode active material was 22%. The areal density of lithium in the lithium replenishing layer was 0.0215 $g/dm^2$. Other parameters were the same as those in Example 1.

Example 3

The percentage by mass of the LMFP in the positive electrode active material was 90%. The percentage by mass of the high-nickel ternary material in the positive electrode active material was 10%. The areal density of lithium in the lithium replenishing layer was 0.0215 $g/dm^2$. Other parameters were the same as those in Example 1.

Example 4

In the negative electrode active material of the negative electrode active layer, the percentage by mass of graphite was 83%, the percentage by mass $\delta$ of silicon oxide was 17%. The areal density of lithium in the lithium replenishing layer was 0.0262 $g/dm^2$. Other parameters were the same as those in Example 1.

Example 5

In the negative electrode active material of the negative electrode active layer, the percentage by mass of graphite was 70%, the percentage by mass $\delta$ of silicon oxide was 30%. The areal density of lithium in the lithium replenishing layer was 0.0462 $g/dm^2$. Other parameters were the same as those in Example 1.

Example 6

In the negative electrode active material of the negative electrode active layer, the percentage by mass of graphite was 90%, the percentage by mass $\delta$ of silicon oxide was 10%. The double-side areal density $m_1$ of the negative electrode plate was 1.86 $g/dm^2$. The areal density of lithium in the lithium replenishing layer was 0.0184 $g/dm^2$. Other parameters were the same as those in Example 1.

Example 7 a was 1.05. The areal density of lithium in the lithium replenishing layer was 0.0206 $g/dm^2$. Other parameters were the same as those in Example 1.

Example 8 a was 1.15. The areal density of lithium in the lithium replenishing layer was 0.0225 $g/dm^2$. Other parameters were the same as those in Example 1.

Example 9 x was 0.8. The specific discharge capacity $M_1$ of silicon oxide was 1470 mAh/g. The first efficiency $\eta$ of silicon oxide was 83%. The areal density of lithium in the lithium replenishing layer was 0.0250 $g/dm^2$. Other parameters were the same as those in Example 1.

Example 10 x was 0.6. The specific discharge capacity $M_1$ of silicon oxide was 1500 mAh/g. The first efficiency $\eta$ of silicon oxide was 82%. The areal density of lithium in the lithium replenishing layer was 0.0270 $g/dm^2$. Other parameters were the same as those in Example 1.

Example 11

The double-side areal density of the positive electrode plate was 5 $g/dm^2$. The double-side areal density $m_1$ of the negative electrode plate was 1.92 $g/dm^2$. The areal density of lithium in the lithium replenishing layer was 0.0265 $g/dm^2$. Other parameters were the same as those in Example 1.

Example 12

The compaction density of the positive electrode plate was 2.8 $g/cm^3$. The areal density of lithium in the lithium replenishing layer was 0.0215 $g/dm^2$. Other parameters were the same as those in Example 1.

Example 13

The double-side areal density $m_1$ of the negative electrode plate was 1.8 $g/dm^2$. The areal density of lithium in the lithium replenishing layer was 0.0249 $g/dm^2$. Other parameters were the same as those in Example 1.

Example 14

The compaction density of the negative electrode plate was 1.65 $g/cm^3$. The areal density of lithium in the lithium replenishing layer was 0.0215 $g/dm^2$. Other parameters were the same as those in Example 1.

Example 15

The injection coefficient of the electrolyte solution was 3.2. Other parameters were the same as those in Example 1.

Example 16

The double-side areal density of the positive electrode plate was 4.2 $g/dm^2$. The areal density of lithium in the lithium replenishing layer was 0.0215 $g/dm^2$. Other parameters were the same as those in Example 1.

Example 17

The double-side areal density of the positive electrode plate was 5.2 $g/dm^2$. The areal density of lithium in the lithium replenishing layer was 0.0273 $g/dm^2$. Other parameters were the same as those in Example 1.

Example 18

The compaction density of the positive electrode plate was 2.5 $g/cm^3$. The areal density of lithium in the lithium replenishing layer was 0.0215 $g/dm^2$. Other parameters were the same as those in Example 1.

Example 19

The compaction density of the positive electrode plate was 2.9 $g/cm^3$. The areal density of lithium in the lithium replenishing layer was 0.0215 $g/dm^2$. Other parameters were the same as those in Example 1.

Example 20

The double-side areal density of the positive electrode plate was 3.7 $g/dm^2$. The double-side areal density m1 of the negative electrode plate was 1.4 g/dm². The areal density of lithium in the lithium replenishing layer was 0.0193 g/dm². Other parameters were the same as those in Example 1.

Example 21

The double-side areal density $m_1$ of the negative electrode plate was 1.85 g/dm². The areal density of lithium in the lithium replenishing layer was 0.0256 g/dm². Other parameters were the same as those in Example 1.

Example 22

The compaction density of the negative electrode plate was 1.45 g/cm³. The areal density of lithium in the lithium replenishing layer was 0.0215 g/dm². Other parameters were the same as those in Example 1.

Example 23

The compaction density of the negative electrode plate was 1.80 g/cm³. The areal density of lithium in the lithium replenishing layer was 0.0215 g/dm². Other parameters were the same as those in Example 1.

Example 24

The injection coefficient of the electrolyte solution was 2.7. Other parameters were the same as those in Example 1.

Comparative Example 1

The percentage by mass of the LMFP in the positive electrode active material was 60%. The percentage by mass of the high-nickel ternary material in the positive electrode active material was 40%. The areal density of lithium in the lithium replenishing layer was 0.0215 g/dm². Other parameters were the same as those in Example 1.

Comparative Example 2

The percentage by mass of the LMFP in the positive electrode active material was 98%. The percentage by mass of the high-nickel ternary material in the positive electrode active material was 2%. The areal density of lithium in the lithium replenishing layer was 0.0215 g/dm². Other parameters were the same as those in Example 1.

Comparative Example 3

In the negative electrode active material of the negative electrode active layer, the percentage by mass of graphite was 60%, the percentage by mass $\delta$ of silicon oxide was 40%. The areal density of lithium in the lithium replenishing layer was 0.0616 g/dm². Other parameters were the same as those in Example 1.

Comparative Example 4 a was 1.2. The areal density of lithium in the lithium replenishing layer was 0.0235 g/dm². Other parameters were the same as those in Example 1.

Comparative Example 5 x was 0.45. The specific discharge capacity $M_1$ of silicon oxide was 2250 mAh/g. The first efficiency η of silicon oxide was 78%. The areal density of lithium in the lithium replenishing layer was 0.0495 g/dm². Other parameters were the same as those in Example 1.

Comparative Example 6 x was 1.7. The specific discharge capacity $M_1$ of silicon oxide was 1100 mAh/g. The first efficiency η of silicon oxide was 89%. The areal density of lithium in the lithium replenishing layer was 0.0121 g/dm². Other parameters were the same as those in Example 1.

Comparative Example 7

The lithium replenishing layer was not included. The double-side areal density $m_1$ of the negative electrode plate was 2.46 g/dm². Other parameters were the same as those in Example 1.

The lithium-ion batteries of Examples 1 to 24 and Comparative Examples 1 to 7 were subjected to a test of specific capacity of the positive electrode, a test of the capacity retention rate after 2000 charging and discharging cycles, a test of the expansion rate of the thickness of the negative electrode plate during a single charging and discharging cycle, a test of the rate performance of the battery, and a test of DSC trigger temperature of the positive electrode active material. The test processes were as follows.

Test of Specific Capacity of Positive Electrode:

At normal temperature (25° C.), the lithium-ion battery was charged at a rate of 0.1 C and discharged at a rate of 0.1 C. The charge and discharge voltage ranged from 2.5 to 4.2 V. Three charging and discharging cycles were carried out. The specific capacity of the positive electrode was calculated according to the amount of material coated on the electrode plate and the third discharge capacity of the lithium-ion battery.

Test of Capacity Retention Rate after 2000 Charging and Discharging Cycles:

The lithium-ion battery was charged at a rate of 1 C and discharged at a rate of 1 C. The charge and discharge voltage ranged from 2.5 to 4.2 V. After charging and discharging at 45° C. for 2000 cycles, the capacity retention rate of the battery after 2000 cycles was obtained according to the ratio of the discharge capacities of the battery at the first cycle and at the $2000^{th}$ cycle.

Test of Expansion Rate of Thickness of Negative Electrode Plate During a Single Charging and Discharging Cycle:

The positive and negative electrode plates and the electrolyte solution were put into a cavity where an electrode plate positioner was located. Vacuumizing treatment was carried out before testing to remove bubbles in the cavity. It should be noted that during testing of the negative electrode, an electrode plate with small expansion, such as LMO (lithium manganate), should be used as the positive electrode. Similarly, during testing of the positive electrode, an electrode plate with small expansion, such as LTO (lithium titanate), should be used as the negative electrode. During the process of charging and discharging the battery at 0.1 C, the thickness change of the electrode plate was collected, and the expansion rate of the electrode plate was obtained.

Test Method of Rate Performance of the Battery:

At 25° C., the battery was charged to 4.2 V at a constant current of 0.2 C, then to a cutoff current of 0.05 C at the constant voltage of 4.2 V, allowed to stand for 10 min, and discharged at a constant current of 0.2 C to 2.5 V. The cycle was repeated three times. The discharge capacity of the third cycle as recorded as C0. The battery was fully charged respectively at constant currents of 0.2 C0 and 5.0 C0 and a constant voltage, and then discharged at the same current (⅓ C). Taking the 0.2 C0 discharge capacity as a benchmark, the ratio of the 5.0 C0 discharge capacity to the 0.2 C0 discharge capacity was used as an indicator to evaluate the rate performance.

Test of DSC Trigger Temperature of the Positive Electrode Active Material:

The positive electrode active material of each of the above lithium-ion batteries was charged to a fully charged state (specifically: first charged at a constant current of 0.1 C to a cut-off voltage of 4.2 V, and then charged at a constant voltage of 4.2 V, the cut-off current being 0.05 C). The positive electrode plate in the fully charged state and the electrolyte solution were placed in a high temperature crucible, and the temperature was raised at a heating rate of 5° C./min. The thermal spectra were measured by differential scanning calorimeter (DSC) to observe the trigger temperature of thermal runaway of the positive electrode active material.

Table 1 gives test data of the lithium-ion batteries of Examples 1 to 24 and Comparative Examples 1 to 7.

As can be seen from Table 1, in Examples 1 to 24, the specific capacities of the positive electrodes of the lithium-ion batteries were all greater than 150 mAh/g; the energy densities of the lithium-ion batteries were all greater than 250 Wh/kg, and the lithium-ion batteries of Example 11 and Example 17 reached 270 Wh/kg or more; the capacity retention rates of the lithium-ion batteries after 2000 charging and discharging cycles were all greater than 76%, and the lithium-ion battery in Example 8 reached 85%; the expansion rates of thickness of the negative electrodes of the lithium-ion batteries after a single charging and discharging cycle were all less than 13%, and the expansion rates of thickness of the negative electrodes of the lithium-ion batteries in Example 7, Example 20 and Example 22 after a single charging and discharging cycle were only 8%; and the ratios of the 5.0 C discharge capacity to the 0.2 C discharge capacity of the lithium-ion batteries were all higher than 81%, and the ratios of the 5.0 C discharge capacity to the 0.2 C discharge capacity of the lithium-ion batteries in Example 16 and Example 20 reached 95%, showing good rate discharge performance. In terms of safety, with the effective coordination of the LMFP and the high-nickel ternary material, the DSC trigger temperatures of the positive electrode

TABLE 1

| | Test data of lithium-ion batteries in various examples | | | | | |
|---|---|---|---|---|---|---|
| Example | Specific capacity of positive electrode (mAh/g) | Energy density of lithium-ion battery (Wh/kg) | Expansion rate of thickness of negative electrode during a single charging and discharging process (%) | Capacity retention rate after 2000 charging and discharging cycles (%) | Rate discharge (%, 5 C/ 0.2 C) | DSC trigger temperature of the positive electrode active material (° C.) |
| Example 1 | 154.4 | 263 | 9 | 84 | 91 | 259 |
| Example 2 | 155.2 | 259 | 9 | 82 | 93 | 255 |
| Example 3 | 150.2 | 250 | 9 | 80 | 84 | 265 |
| Example 4 | 154.4 | 261 | 10 | 83 | 91 | 259 |
| Example 5 | 154.4 | 257 | 13 | 81 | 91 | 259 |
| Example 6 | 154.4 | 252 | 11 | 83 | 91 | 259 |
| Example 7 | 154.4 | 265 | 8 | 82 | 91 | 259 |
| Example 8 | 154.4 | 260 | 11 | 85 | 91 | 259 |
| Example 9 | 154.4 | 262 | 11 | 82 | 91 | 259 |
| Example 10 | 154.4 | 261 | 13 | 76 | 91 | 259 |
| Example 11 | 154.4 | 271 | 11 | 81 | 86 | 259 |
| Example 12 | 154.4 | 263 | 9 | 83 | 88 | 259 |
| Example 13 | 154.4 | 260 | 11 | 82 | 89 | 259 |
| Example 14 | 154.4 | 263 | 10 | 83 | 85 | 259 |
| Example 15 | 154.4 | 260 | 9 | 84 | 91 | 259 |
| Example 16 | 154.4 | 255 | 9 | 84 | 95 | 259 |
| Example 17 | 154.4 | 275 | 9 | 79 | 81 | 259 |
| Example 18 | 154.4 | 263 | 9 | 79 | 90 | 259 |
| Example 19 | 154.4 | 263 | 9 | 78 | 86 | 259 |
| Example 20 | 154.4 | 250 | 8 | 79 | 95 | 259 |
| Example 21 | 154.4 | 256 | 13 | 79 | 87 | 259 |
| Example 22 | 154.4 | 255 | 8 | 81 | 88 | 259 |
| Example 23 | 154.4 | 265 | 12 | 76 | 85 | 259 |
| Example 24 | 154.4 | 266 | 9 | 80 | 89 | 259 |
| Comparative Example 1 | 162.8 | 276 | 9 | 68 | 94 | 235 |
| Comparative Example 2 | 146.8 | 235 | 9 | 65 | 79 | 267 |
| Comparative Example 3 | 154.4 | 255 | 22 | 56 | 88 | 259 |
| Comparative Example 4 | 154.4 | 260 | 18 | 75 | 91 | 259 |
| Comparative Example 5 | 154.4 | 256 | 24 | 50 | 90 | 259 |
| Comparative Example 6 | 154.4 | 268 | 9 | 40 | 91 | 259 |
| Comparative Example 7 | 154.4 | 210 | 12 | 71 | 89 | 259 | active materials of the lithium-ion batteries in examples 1 to 24 were higher than 255° C., that is, the lithium-ion batteries can operate safely at a temperature not higher than 255° C., thereby improving the safety of the lithium-ion battery.

However, the lithium-ion batteries in Comparative Examples 1 to 7 cannot meet the multiple performance requirements of specific capacity, cycle retention rate and safety. Specifically, compared with Example 1, a larger quantity of the ternary material was added in the positive electrode active material of the lithium-ion battery of Comparative Example 1, resulting in a capacity retention rate of 68% after 2000 charging and discharging cycles. Due to the poor safety performance of the ternary material, the DSC trigger temperature of the positive electrode active material of the lithium-ion battery of Comparative Example 1 was only 235° C., limiting the use of the lithium-ion battery at high temperature. Compared with Example 1, a larger quantity of LMFP was added in the positive electrode active material of the lithium-ion battery of Comparative Example 2, resulting in a specific capacity of the positive electrode of only 146.8 mAh/g and an energy density of only 235 Wh/kg. Compared with Example 1, a larger quantity of silicon oxide was added in the negative electrode active layer of the lithium-ion battery of Comparative Example 3, resulting in an expansion rate of thickness of up to 22% of the negative electrode of the lithium-ion battery during a single charging and discharging process, seriously affecting the cycle life of the lithium-ion battery, with the capacity retention rate after 2000 charging and discharging cycles being 56%. Compared with Example 1, the value of a in the lithium-ion battery of Comparative Example 4 was too large and reached 1.2, that is, the reserved amount given by the lithium replenishing layer was excessive, the expansion of the negative electrode in the charging and discharging process was large, and the expansion rate of thickness of the negative electrode during the first charging and discharging process reached 18%. Compared with Example 1, the value of x of Comparative Example 5 was too small, only 0.45. Although the specific discharge capacity $M_1$ of silicon oxide reached 2250, the first efficiency $\eta$ of silicon oxide was 78%. In this case, the silicon oxide is similar to pure silicon. The expansion of the negative electrode during a single charging and discharging process was large, affecting the cycle performance of the lithium-ion battery, as a result, the expansion rate of thickness of the negative electrode during a single charging and discharging process reached 24%, and the capacity retention rate after 2000 charging and discharging cycles was only 50%. Compared with Example 1, the value of x of Comparative Example 6 was too large and reached 1.7. Although the first efficiency $\eta$ of silicon oxide reached 89%, the specific discharge capacity $M_1$ of silicon oxide was only 1100, which is not conducive to the improvement of the cycle performance of the lithium-ion battery, the capacity retention rate after 2000 charging and discharging cycles was only 40%. Compared with Example 1, the lithium-ion battery in Comparative Example 7 did not include the lithium-replenishing layer, as a result, the double-side areal density of the negative electrode plate was too large and reached 2.46 g/dm², active lithium of the positive electrode active material was consumed by the negative electrode active material during charging and discharging, reducing the energy density of the lithium-ion battery, the energy density of the lithium-ion battery was only 210 Wh/kg.

Although the embodiments of the present disclosure have been described above in conjunction with the accompanying drawings, the present disclosure is not limited to the specific embodiments described above, and the specific embodiments described above are merely illustrative and not restrictive. Those having ordinary skill in the art can make various changes and modifications based on the teachings of the present disclosure without departing from the spirit of the present disclosure and the scope of the appended claims. Such changes and modifications also fall within the protection scope of the present disclosure.

What is claimed is:

1. A lithium-ion battery, comprising:
   a positive electrode plate, a separator, and a negative electrode plate, wherein the separator is arranged between the positive electrode plate and the negative electrode plate;
   the positive electrode plate comprises a positive electrode current collector and a positive electrode active layer laminated in sequence; a positive electrode active material in the positive electrode active layer comprises lithium manganese iron phosphate and a ternary material; based on the total mass of the positive electrode active material, a percentage by mass of the lithium manganese iron phosphate ranges from 78% to 83%, and a percentage by mass of the ternary material ranges from 17% to 22%;
   the negative electrode plate comprises a negative electrode current collector and a negative electrode active layer laminated in sequence; the negative electrode active layer comprises a composite layer and a lithium replenishing layer; a negative electrode active material in the composite layer comprises a carbon material and $SiO_x$; based on the total mass of the negative electrode active material, a percentage by mass of the carbon material ranges from 83% to 88%, and a percentage by mass of the $SiO_x$ ranges from 12% to 17%; and an areal density of lithium in the lithium replenishing layer is $m_2 = a*M_1*m_1*\delta*(1-\eta)/M_2$,
   wherein $m_2$ is measured in g/dm²; $M_1$ is a value of a specific discharge capacity of the $SiO_x$, and the specific discharge capacity is measured in mAh/g; $m_1$ is a double-side areal density of the negative electrode plate, and $m_1$ is measured in g/dm²; $\delta$ is a percentage by mass of the $SiO_x$ material in the negative electrode active material; $\eta$ is first efficiency of a $SiO_x$ button half cell, wherein the first efficiency is a ratio of a first discharge capacity to a first charge capacity; $M_2$ is a value of a specific capacity of lithium, and the specific capacity is measured in mAh/g; and a value of a ranges from 1.05 to 1.15, and a value of x ranges from 0.6 to 1.5.

2. The lithium-ion battery according to claim 1, a double-side areal density of the positive electrode plate ranges from 4.5 g/dm² to 5.0 g/dm², and a compaction density of the positive electrode plate ranges from 2.7 g/cm³ to 2.8 g/cm³; and the double-side areal density of the negative electrode plate ranges from 1.56 g/dm² to 1.92 g/dm², and a compaction density of the negative electrode plate ranges from 1.60 g/cm³ to 1.65 g/cm³.

3. The lithium-ion battery according to claim 2, wherein a general formula of the ternary material is $LiNi_{a1}CO_{b1}X_{c1}O_2$,
   wherein $0 \leq a1 \leq 1$, $0 \leq b1 \leq 1$, $0 \leq c1 \leq 1$, $a1+b1+c1=1$, and X is at least one metal element in Group IIIB to group VA.

4. The lithium-ion battery according to claim 2, wherein a value of x ranges from 0.8 to 1.2.

5. The lithium-ion battery according to claim 2, wherein an injection coefficient of an electrolyte solution in the lithium-ion battery ranges from 2.9 to 3.2.

6. The lithium-ion battery according to claim 2, wherein the separator comprises a polymer layer, a ceramic layer and an adhesive layer laminated in sequence, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

7. The lithium-ion battery according to claim 1, wherein a general formula of the ternary material is $LiNi_{a1}CO_{b1}X_{c1}O_2$, wherein $0 \leq a1 \leq 1$, $0 \leq b1 \leq 1$, $0 \leq c1 \leq 1$, $a1+b1+c1=1$, and X is at least one metal element in Group IIIB to group VA.

8. The lithium-ion battery according to claim 7, wherein a value of x ranges from 0.8 to 1.2.

9. The lithium-ion battery according to claim 7, wherein an injection coefficient of an electrolyte solution in the lithium-ion battery ranges from 2.9 to 3.2.

10. The lithium-ion battery according to claim 7, wherein the separator comprises a polymer layer, a ceramic layer and an adhesive layer laminated in sequence, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

11. The lithium-ion battery according to claim 1, wherein the carbon material comprises at least one of hard carbon and carbon-coated graphite secondary particle.

12. The lithium-ion battery according to claim 11, wherein a value of x ranges from 0.8 to 1.2.

13. The lithium-ion battery according to claim 11, wherein an injection coefficient of an electrolyte solution in the lithium-ion battery ranges from 2.9 to 3.2.

14. The lithium-ion battery according to claim 11, wherein the separator comprises a polymer layer, a ceramic layer and an adhesive layer laminated in sequence, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

15. The lithium-ion battery according to claim 1, wherein a value of x ranges from 0.8 to 1.2.

16. The lithium-ion battery according to claim 15, wherein an injection coefficient of an electrolyte solution in the lithium-ion battery ranges from 2.9 to 3.2.

17. The lithium-ion battery according to claim 15, wherein the separator comprises a polymer layer, a ceramic layer and an adhesive layer laminated in sequence, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

18. The lithium-ion battery according to claim 1, wherein an injection coefficient of an electrolyte solution in the lithium-ion battery ranges from 2.9 to 3.2.

19. The lithium-ion battery according to claim 1, wherein the separator comprises a polymer layer, a ceramic layer and an adhesive layer laminated in sequence, a thickness of the polymer layer ranges from 5.5 μm to 9 μm, a thickness of the ceramic layer ranges from 1.0 μm to 3.0 μm, and a thickness of the adhesive layer ranges from 1.0 μm to 3.0 μm.

20. The lithium-ion battery according to claim 1, wherein a thickness of the positive electrode current collector ranges from 7 μm to 13.5 μm, and a thickness of the negative electrode current collector ranges from 3.5 μm to 7 μm.

\* \* \* \* \*